Oct. 24, 1967    E. ZILLMER    3,348,449
PHOTOGRAPHIC SLIDE PROJECTOR
Filed Dec. 17, 1965    4 Sheets-Sheet 1

Oct. 24, 1967 E. ZILLMER 3,348,449
PHOTOGRAPHIC SLIDE PROJECTOR
Filed Dec. 17, 1965 4 Sheets-Sheet 2

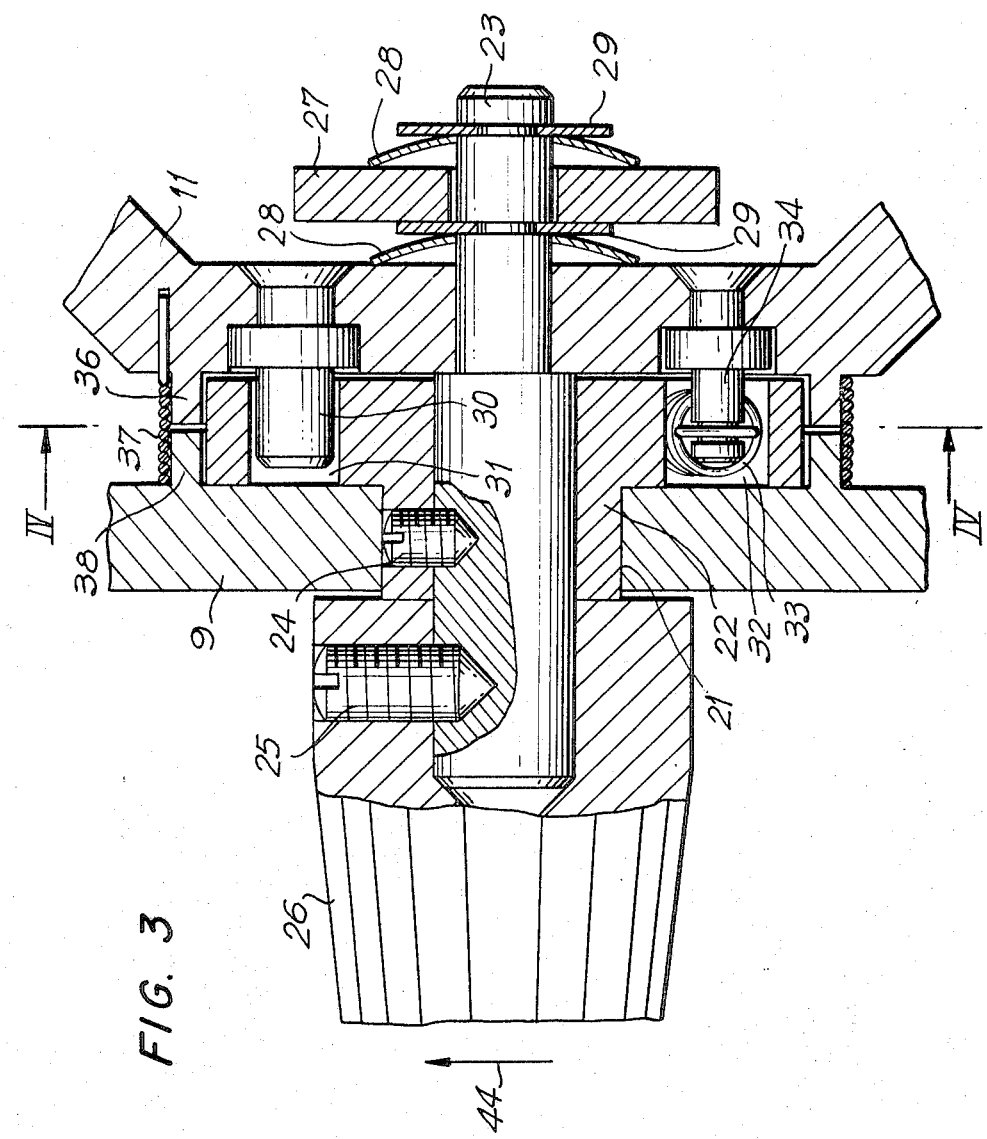

United States Patent Office 3,348,449
Patented Oct. 24, 1967

3,348,449
PHOTOGRAPHIC SLIDE PROJECTOR
Erich Zillmer, Braunschweig, Germany, assignor to Voiglander A.G., Braunschweig, Germany, a corporation of Germany
Filed Dec. 17, 1965, Ser. No. 514,496
Claims priority, application Germany, Dec. 31, 1964, V 27,483
18 Claims. (Cl. 88—27)

ABSTRACT OF THE DISCLOSURE

A photographic slide projector of the type where the operator changes one slide for another, while a second slide is in a projecting position having its image projected. The slide projector has a predetermined optical axis and it has a housing at one side of which the operator is normally located during use of the projector. A manually turnable means, which has a substantially horizontal axis during the use of the projector, this latter axis being inclined at an angle of 45° with respect to the optical axis, has a manually engageable member which is accessible at the latter side of the housing where the operator is normally located, so that in this way the operator can conveniently turn the manually turnable means without changing his position from the side of the projector. A slide-carrier means is operatively connected to the manually turnable means so as to be turned thereby about the horizontal axis of the manually turnable means. This slide carrier means is provided for removably carrying a pair of slides which are respectively situated in planes which are perpendicular to each other at locations angularly distributed about the horizontal axis of the manually turnable means, so that when the latter is turned it is possible to situate one slide in a projection position extending perpendicularly across the optical axis while the other slide is in a plane which is parallel to the optical axis and is located at a position accessible at the side of the housing where the opeartor is normally located, as pointed out above. Thus it is possible for the operator, without changing his position from the one side of the housing, to conveniently remove from the slide-carrier means one slide which has already had its image projected and to replace it with another slide, so that then the slides can conveniently be displaced between the projection position and the side of the housing, so that in this way it is possible to successively project a series of slides in response to turning of the manually turnable means through angular increments of 180° about its substantially horizontal axis. A further means is provided for limiting the manually turnable means to only one direction of rotation, so that the operator can only turn this manually turnable means in one direction.

---

The present invention relates to photographic slide projectors.

More particularly, the present invention relates to that type of projector where it is possible for the operator to turn a carrier for a plurality of slides about an axis inclined at an angle of 45° with respect to the optical axis for the purpose of situating one slide in a projection position while another slide is in a position where the operator can remove it and replace it with a new slide, whereupon through further turning the new slide can be situated at the projection position and the just-projected slide exchanged for another slide.

Known slide projectors of this latter type suffer from several disadvantages. For example, the slide which is in a position to be removed and replaced by another slide is situated at a part of the projector, such as the top thereof, where it is extremely inconvenient and uncomfortable for the operator of the projector to change the slide. Ordinarily, the operator will be located at one side of the projector, and it is quite uncomfortable for the operator to be required to carry out manipulations at the upper part of the projector. Furthermore, with conventional projectors of this latter type the operator must manually displace his hand to a considerable distance in order to provide the required increment of turning which will displace the next slide in a position to be projected. Furthermore, the part of the structure which is manually engaged continually moves into the interior of the projector housing necessitating release and reengagement of the structure which is turned, so that even the turning operations of the known structure are extremely inconvenient to carry out.

It is therefore a primary object of the present invention to provide for a projector of the above general type a construction which enables the operator to carry out the required manipulations in a manner which is far more comfortable and convenient than has heretofore been possible.

In particular, it is an object of the invention to provide a structure which makes it very easy to quickly and conveniently displace a slide into the projection position as well as a structure which makes it very easy and convenient to replace one slide with another.

Furthermore, it is an object of the invention to provide a projector of the above type which will make it very easy for the operator to determine the proper position of a slide in a slide-carrier.

In addition, it is an object of the invention to provide a relatively simple inexpensive structure which requires only simple and convenient manipulations by the operator in order to bring about the desired functions of the projector.

Primarily, with the structure of the invention there is a manually turnable means which is accessible at that side of the projector housing where the operator is normally located during the use of the projector. This manually turnable means has a generally horizontal axis which is inclined to the optical axis and a slide-carrier means is mounted on the manually turnable means to be turned thereby. This slide-carrier means carries a plurality of slides in positions where they can be successively located at a projection position extending across the optical axis, and the carrier means of the invention while locating one slide at the projection position, locates another slide at a location which is freely accessible at the above-mentioned side of the projector housing, so that this latter slide can be easily exchanged for another slide. Therefore, all of the required manipulations can be very easily carried out at the side of the projector housing where the operator is in any event located for the purpose of carrying out the normal operations of the projector.

The invention is illustrated by way of example in the accompanying drawings which form part of this application and in which:

FIG. 3 is a fragmentary sectional elevation, taken at an enlarged scale as compared with FIG. 4, along line III—III of FIG. 4 in the direction of the arrows and showing the manner in which the manually turnable means of the invention is supported as well as how other components of the structure of the invention cooperate with the manually turnable means;

Figure 2:
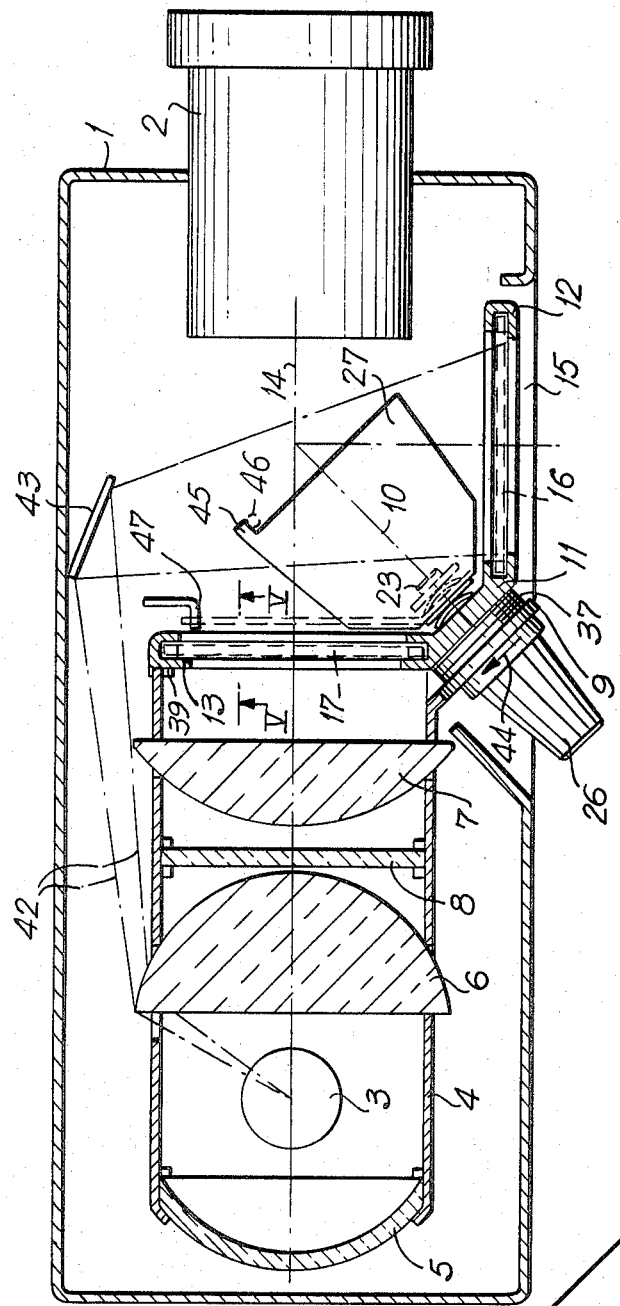
FIG. 2 is a schematic sectional plan view of the projector of FIG. 1.

Referring now to the drawings, a projector housing 1 is illustrated therein. This housing 1 carries at its front end a conventional objective 2. Within the housing 1 is situated, as shown in FIG. 2, optical structure which includes the projection lamp 3 situated within a lamp housing 4 which is itself situated within the projector housing 1. The optical elements also include the concave reflector 5 which is situated behind the lamp 3 and the condensor lenses 6 and 7 as well as the heat-protecting filter 8 situated between the lenses 6 and 7. The housing 1 of the projector also serves to accommodate a wall 9 which extends angularly from a side of the lamp housing 4 and which may be integral with the lamp housing 4, as is indicated in FIG. 2. This wall 9 is situated in a vertical plane when the projector is set up for operation, and furthermore, this plane of the wall 9 extends across the optical axis 14 at an angle of 45° with respect thereto. This wall 9 forms a support for the slide-changing mechanism of the invention.

Figure 1:
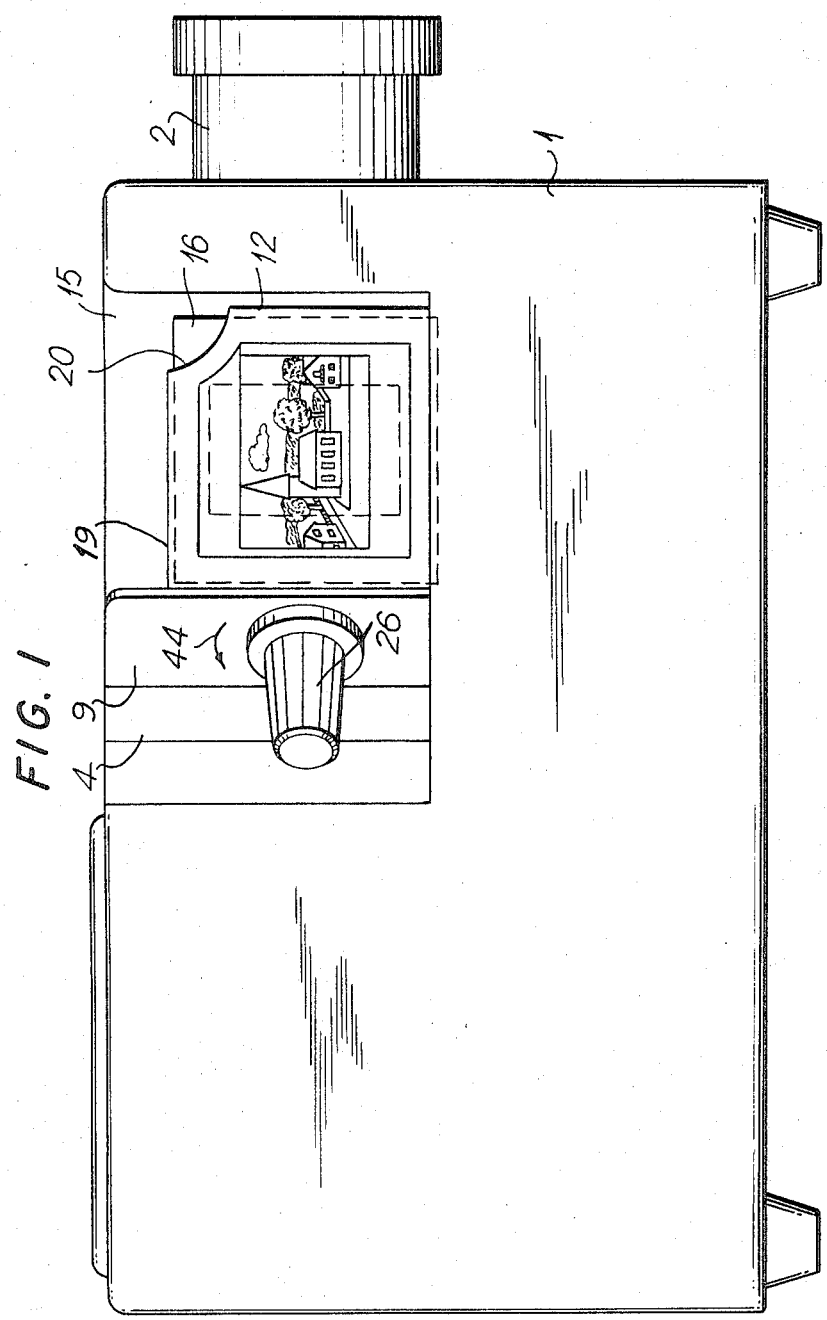
FIG. 1 is a simplified side elevation of a projector according to the present invention as it appears when looking toward that side of the projector where the operator is situated during normal use of the projector.

This slide-changing means of the present invention includes a manually turnable means which is turnable about the axis 10 (FIG. 2) which extends horizontally when the projector is set up for operation. A slide-carrier means 11 is carried by the manually turnable means for turning movement therewith about the axis 10, and in the illustrated example the slide-carrier means includes a pair of holders 12 and 13 having the configuration of suitable frames for receiving slides and from which the slides can be easily removed as well as inserted in a manner described in greater detail below. The angular relationship of the holders 12 and 13 of the slide-carrier means 11 is such, as is apparent from FIG. 2, that when a slide carried by one holder is in a projection position extending across the optical axis 14, then the other slide is situated conveniently at the side of the housing 1 which is visible in FIG. 1 in a cutout 15 which is formed in this side of the housing so that this other slide holder is freely accessible at the latter side of the housing 1. Thus, the holders 12 and 13 have the construction of suitable frames into which slides, such as the slides 16 and 17, may be easily introduced and removed. The slides are engaged by the frames along the edge portions of the slide, and the slides can be releasably clamped in the frames by a suitable spring structure, such as by suitable leaf springs 18, one of which is visible in FIG. 5. The frames which form the holders 12 and 13 have a channel-shaped cross section and extend along the periphery of each slide, and within the channel-shaped frames are situated the leaf springs 18 which will press the frames of the slides against the forward wall of each holder to properly position each slide in a projection plane. Along one of its edges each frame 12 and 13 is formed with a slot 19 through which a slide can be introduced into and removed from the holder, this slot 19 being particularly visible in FIG. 5 which shows the holder 13 without a slide therein so that the slot 19 and the spring 18 will be easily visible. When the holder 12 or the holder 13 is situated at the cutout 15, the operator can easily displace a slide through the slot 19 either into or out of the holder. As is apparent from FIG. 1, each holder has a cut-away corner portion 20 into which a corner of the slide frame extends so as to be readily accessible to the operator for easy and convenient removal from or replacement in the holder of the slide-carrier means 11.

Referring now to FIG. 3, the slide-carrier means 11 is supported by the manually turnable means of the invention in the following manner:

The wall 9 is formed with an opening 21 in which a disc 22 is supported for free rotary movement. The manually turnable means of the invention includes an elongated shaft 23 whose axis coincides with the axis 10 about which the manually turnable means turns, and this shaft 23 extends through the intermediate disc 22 and is fixed to the latter by way of a set screw 24. At its free end which projects to the left, as viewed in FIG. 3, beyond the disc 22, the shaft 23 fixedly carries a knob 26 which is fixed to the shaft 23 by a set screw 25 and which is freely accessible to the operator, as is apparent from FIGS. 1 and 2.

The shaft 23 has a portion of reduced diameter, situated just to the right of the disc 22, as viewed in FIG. 3, on which the slide-carrier means 11 is frictionally mounted. Thus, the central portion of the slide-carrier means 11 is formed with a bore through which the reduced portion of the shaft 23 extends with a sliding fit which provides for frictional engagement between the slide-carrier means 11 and the manually turnable means 23.

In addition, the structure includes a light-blocking means 27 which serves to block the passage of light along the optical axis, in a manner described in greater detail below, and this light-blocking means 27 is also frictionaly carried by the shaft 23 at its portion of reduced diameter. The light-blocking means 27 and the slide-carrying means 11 are acted upon by a pair of cup-springs 28 which respectively engage snap-rings 29 mounted in suitable grooves of the shaft 23 so that these springs 28 urge the light-blocking means and the slide-carrying means 11 to the left, as viewed in FIG. 3. The right cup-spring 28 will urge the light-blocking means 27 into engagement with the left snap-ring 29 of FIG. 3, while the left spring 28 will urge the slide-carrier means 11 into engagement with the shoulder of the shaft 23 defined between its portions of different diameters, respectively. As a result it is possible for the slide-carrier means 11 to have at least a limited yieldable elastic axial displacement with respect to the shaft 23 for a purpose described below. With this construction the slide-carrier means 11 and the light-blocking means 27 are frictionally mounted on the shaft 23 for rotation therewith unless restrained by structure such as that referred to below.

Figure 4:
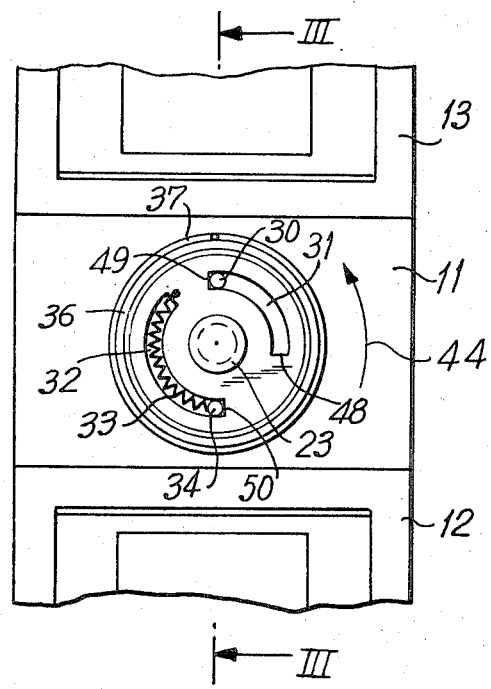
FIG. 4 is a transverse section of the structure of FIG. 3, taken along the line IV—IV of FIG. 3 in the direction of the arrows and showing the structure of FIG. 3 on a smaller scale than FIG. 3, while also illustrating additional portions of the slide-carrier which are not visible in FIG. 3.

The connection between the slide-carrying means 11 and the shaft 23 includes a lost-motion transmission. This latter transmission includes a pin 30 which is fixed to the slide-carrier means 11 and which extends into an elongated arcuate slot 31 which extends along a circle coaxially surrounding the shaft 23 and which is formed in the disc 22 (FIG. 4). Thus, with this lost-motion transmission it is clear that when the operator turns the shaft 23 and the disc 22 in the direction of the arrow 44 of FIG. 4, the pin 30 together with the carrier 11 will not be displaced until the right end 48 of the slot 31 engages the pin 30, as will be apparent from the description below. The disc 22 is formed with a further slot 32 extending along the same circle as that along which the slot 31 extends, and accommodating in its interior a compression spring 33, one end of which is fixed to a pin 34 which is received in the slot 32 and which is fixed to the carrier 11 and the other end of which is fixed to the disc 22 at the end of the slot 32 distant from the pin 34. The spring 33 is compressed so as to tend to push the pin 34 in a counter-clockwise direction and the disc 22 in a clockwise direction with respect to the pin 34, as viewed in FIG. 4.

A mechanical blocking means is provided for blocking the manually turnable means 23 against rotation in one direction, so that the operator can only turn the shaft 23 in the opposite direction, which is the direction indicated by the arrow 44 in FIG. 4. This mechanical blocking means includes a coil spring 37 which coaxially surrounds the shaft 23 and which is fixed at one end to the slide-carrier means 11. Convolutions of the coil spring 37 engage with a light sliding friction a stationary ring 38 which may be formed integrally with the wall 9 and which coaxially surrounds the shaft 23. With this construction, when the operator turns the shaft 23 in a clockwise direction, as viewed in FIG. 4, the convolutions of the coil spring 37 tend to tighten their grip on the stationary ring 38 thus preventing turning of the shaft 23 in this direction. The operator when he turns the shaft 23 in the direction of the arrow 44 of FIG. 4 tends to spread the convolutions open by their frictional engagement with the ring 38 so that free turning of the slide-carrier means 11 only in the direction of the arrow 44 is provided by the blocking means 37, 38.

The structure of the invention further includes a detent means which releasably holds the slide-carrier means 11 at the angular positions at which the slides are successively situated in the projection plane. The holder 13 is shown in a position situating the slide 17 in the projection plane in FIG. 2. The detent means includes a springy projection 39 (FIG. 5) forming part of each holder 12 and 13. In addition, the detent means includes a notch 40 formed in a wall of the lamp housing 4 and receiving the springy projection 39 when the frame of which it forms a part is positioned so as to locate the slide carried thereby precisely in the projection plane extending perpendicularly across the optical axis 14. The movement of each detent projection 39 into and out of the detent notch 40 is facilitated by the possibility of yieldable elastic axial movement of the slide-carrier means 11 along the shaft 23, as pointed out above. Moreover, the precise positioning of each holder so as to locate the slide carried thereby in the projection plane can be enhanced by providing suitable stop edges 41 of the housing 4 against which each holder 12 and 13 is pressed by the action of the left spring 28 of FIG. 3 on the slide-carrier means 11.

The light-blocking means 27 is in the form of an opaque plate having the configuration shown most clearly in FIG. 2. At its inner end which is nearest to the knob 26 this plate 27 has an extension which extends perpendicularly across the shaft 23 and which is formed with the opening which receives the shaft 23, as indicated in FIG. 3. The opaque plate 27 shown in FIG. 2 is situated approximately the elevation of the upper edges of the slides when they are in the positions indicated in FIG. 2. When the plate 27 turns with the shaft 23, in a manner described below, it will turn from the solid line positioning indicated in FIG. 2 into the dotted line position where it is situated in a plane extending perpendicularly across the optical axis 14 and precisely in front of and parallel to the slide 17, with the parts in the position shown in FIG. 2. At one of its outer corners the opaque plate 27 has a stop-projection 45 which engages a stationary stop 47 when the plate 27 has been displaced to the light-blocking position indicated in dotted lines in FIG. 2, and it is in this blocking position that the plate 27 is maintained by the stationary stop 47 during continued turning of the shaft 23 with respect to the light-blocking means 27, as described below. The plate 27 can be returned to the non-blocking position indicated in solid lines in FIG. 2, also in a manner described below, and in this non-blocking position the projection 45 engages a further stationary stop member 46 which determines the non-blocking position of the opaque plate 27. Therefore, the stops 46 and 47 form a pair of stops which respectively determine the non-blocking and the blocking positions of the light-blocking means 27.

The invention further includes a structure which makes it extremely convenient for the operator to properly position each slide in the holder therefor. As is apparent from FIG. 2, the dotted lines 42 indicate part of the light derived from the projection lamp 3 which passes through an edge portion of the condenser lens 6. This portion of the light is reflected by a suitable mirror or other reflector 43 through the region of the cutout 15 so that the particular slide which is carried by the holder at the cutout 15 will have this light passing therethrough. Therefore, the operator can, by means of this illumination of the slide positioned in the holder at the cutout 15, easily determine the proper elevational and lateral position of the slide in its holder, and in this way the operator knows before the slide reaches the projection position which slide will be the next one to be projected. In this way the operator can provide a suitable oral introduction to the subject matter of the slide which is about to be projected.

Figure 5:
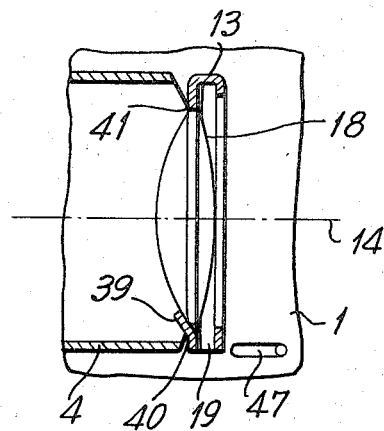
FIG. 5 is a fragmentary sectional elevation taken along line V—V of FIG. 2 in the direction of the arrows and showing a detent structure as well as part of a stop structure.

The above-described structure operates in the following manner:

With the position of the part shown in the drawing the holder 13 positions the slide 17 in the projection position extending perpendicularly across the optical axis, and the holder 13 is releasable held in this position by the detent means 39, 40 (FIG. 5). As was pointed out above the slide 17 is not shown in FIG. 5 so as to more clearly illustrate the leaf spring 18. Of course, a pair of the leaf springs may be provided at opposed channel portions of each slide holder to provide a balanced pressure on each slide.

At this time the slide holder 12 is situated at the cutout 15 so that it is possible in a very convenient manner for the operator to manually remove one slide and replace it by a new slide. The slide which is introduced into the holder 12 can be properly positioned as a result of the light 42 which is directed through this slide.

In order to displace the slide which is now in the holder 12 into the projection position, the operator turns the knob 26 in the direction of the arrow 44 (FIGS. 1–4). Of course, the disc 22 will turn with the shaft 23 which will of course turn with the knob 26. However, as a result of the lost-motion transmission the disc 22 will turn with respect to the slide-carrier 11 from the starting position indicated in FIG. 4 by engagement of the end 49 of the slot 31 with the pin 30 to the end position which is determined by engagement of the end 48 of the slot 31 with the pin 30. The pin 30 together with the slide-carrier means 11 are maintained stationary at this time by the detent means 39–40. Thus, while the pin 30 together with the slide-carrier means 11 remains stationary, the lost-motion transmission permits turning of the shaft 23 with respect to the slide-carrier means 11 through the angular increment determined by the length of the slot 31 of the lost-motion transmission. At this time the spring 33 is compressed as the end 50 of the slot 32 is displaced away from the pin 34 which remains stationary at this time.

At this time there is nothing to prevent turning of the light-blocking means 27 together with the shaft 23 away from the stop 46 from the non-blocking position shown in solid lines in FIG. 2 into the blocking position shown in dotted lines in FIG. 2, so that during the free turning increment provided by the lost-motion transmission, the light-blocking means 27 is displaced into the light-blocking position. When the light-blocking plate 27 engages the stop 47 it completely blocks passage of light along the optical axis and engagement of the opaque plate 27 with the stop 47 prevents further turning of the opaque plate 27 with the shaft 23. Simultaneously with engagement between stop 47 and plate 27 the end 48 of slot 31 reaches pin 30, so that the free movement provided by the lost-motion transmission is terminated, and now during the continued turning of the shaft 23 in the direction of the arrow 44 the turning of the shaft 23 will be transmitting to the slide-carrier means 11 which is displaced in opposition to the force of the detent means 39, 40, so that while the light-blocking means 27 remains in its blocking position, the slide which has just been projected is displaced away from the projection plane to the cutout 15 while the next slide is displaced into the projection plane. The detent means will provide for an axial shifting of the slide-carrier means 11 along the shaft 23 as pointed out above. This movement of the detent means to and from its engaged position can easily be felt by the operator at the knob 26, and thus the operator will easily detect at the knob 26 when the next projection 39 has been received in the notch 40, so that the operator will know when the next slide has been precisely positioned in the projection plane.

The operator will now release the knob 26, and the compressed spring 33 will expand, turning the disc 22 in a direction opposite to that indicated by the arrow 44 until the end 49 of the slot 31 reaches the pin 30 and the end 50 of the slot 32 reaches the pin 34. At this time the slide-carrier means 11 will be maintained stationary by the detent means, but the light-blocking means 27 will return from its blocking to its non-blocking position together with the shaft 23, and of course the stop 46 will determine the non-blocking position of the opaque plate 27.

The previously projected slide is now freely accessible at the cutout 15 so that it can be manually exchanged for the next slide. The spring 37 as well as the detent means 39, 40, prevent movement of the slide-carrier means 11 when one slide is exchanged for another.

With the structure described above and shown in FIG. 2, the axis 10 makes an angle of 45° with respect to the optical axis 14, and the pair of slide holders 12 and 13 are displaced with respect to each other by an angle of 90° with respect to an axis perpendicular to the axis 10 and extending normal to the plane in which FIG. 2 is taken. Of course, depending upon the characteristics of a particular projector, different angular sizes may be chosen for the structure of the invention. Also, instead of providing an arrangement where the slide-carrier means has only a pair of slide holders, it is possible to provide a slide-carrier means which has three or more slide-holders. Of course, with this latter arrangement, the extent of turning of the knob 26 at each increment will be different. With this latter arrangement the location at which a slide is changed is preferably chosen in such a way that the newly introduced slide is the next one to be projected. The optical structure which directs part of the light through the new slide can, of course, be adapted to the particular location of the slide with an arrangement of this latter type.

With the structure described above, the light-blocking means provides in combination with the other structure a masked change of slides. In other words, during exchanging of the slides the projected image remains stationary while it is covered by the masking achieved by movement of the opaque plate 27 into its light-blocking position, and it is only while the image is masked by the plate 27 that the slides are moved so as to replace the slide 17 with a new slide 16. When the opaque plate 27 is displaced to its non-blocking position a new slide is already in position, so that a stationary new image is uncovered.

Figure 6:
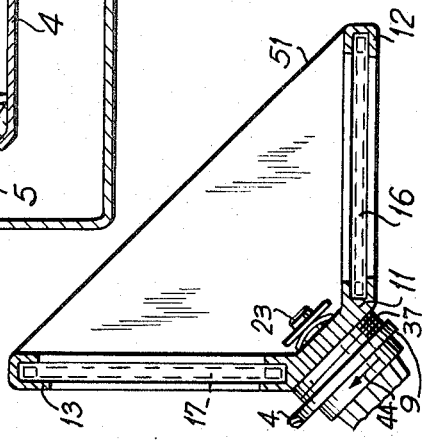
FIG. 6 is a fragmentary sectional illustration, taken in a plane similar to that of FIG. 2, and showing an embodiment of a light-blocking means different from that of FIG. 2.

It is possible to simplify the structure with an arrangement as shown in FIG. 6, although the masking and unmasking of stationary images will be sacrificed. Thus, referring to FIG. 6, it will be seen that the masking plate 27 is omitted and instead an opaque plate 51 is fixed directly to the carrier means 11 extending between edge portions of the holders 12 and 13 in a plane perpendicular to the planes in which the holders 12 and 13 are situated. This masking plate 51, which is of course opaque, thus forms a unitary structure with the slide-carrier means 11.

With this arrangement when the shaft 23 is turned the viewers will see the slide which has just been projected move out of the projection plane while the opaque plate 51 moves into the projection plane to provide masking of the light beam. Finally, the opaque plate 51 moves away from the projection plane while the new slide is displaced into the projection plane and the movement of the new image is clearly visible.

In order to render observation of the slide at the cutout 15 more convenient, a magnifying lens may be situated in front of the slide so as to provide the operator with an enlarged image thereof. This magnifying lens can be built into a part of the side wall of the projector housing so as to form a fixed part of the projector. It is, however, also possible to provide a wall portion which overlaps the cutout 15 and which has a short supporting tube into which a tube which surrounds and carries a magnifying lens can be introduced. An arrangement of this type makes an easy adjustability of the magnifying lens possible. The part of the lens-carrying tube which extends outwardly beyond the side wall of the projector housing when the projector is used, can when the projector is not used, be removed from the supporting tube or it can, when the slide-holder in the cutout 15 does not carry any slide, be shifted through the free space defined by the frame of the slide holder, and in this position the structure for viewing a slide at the cutout 15 will project beyond the side wall of the housing either not at all or only to a small, inconsequential extent.

What is claimed is:

1. In a photographic slide projector having a predetermined optical axis, a housing having a side where the operator is normally located during operation of the projector, manually turnable means having a substantially horizontal axis during use of the projector, said substantially horizontal axis being inclined at an angle with respect to the optical axis sufficiently great to provide for the substantially horizontal axis a direction extending toward an operator normally located at said side of said housing, so that said manually turnable means can be conveniently turned by the operator, and slide-carrier means, connected with said manually turnable means to be turned thereby, for removably carrying a plurality of slides respectively in planes which make predetermined angles with each other and which are respectively situated at locations angularly distributed about said substantially horizontal axis for situating one slide in a projection position extending perpendicularly across the optical axis and at least one additional slide in a plane parallel to the optical axis at a position accessible at said side of said housing to be conveniently removed from said slide-carrier means and replaced by another slide, so that said slides can be displaced between said projection position and said side of said housing for successively projecting a series of slides in response to turning of said manually turnable means, and means coacting with said manually turnable means for limiting the latter to only one direction of rotation.

2. In a photographic slide projector having a predetermined optical axis, a housing having a side where the operator is normally located during use of the projector, manually turnable means having a substantially horizontal axis, during use of the projector, said substantially horizontal axis being inclined at an angle of 45° with respect to the optical axis and said manually turnable means having a manually engageable member accessible at said side of said housing so that the operator can conveniently turn said manually turnable means, and slide-carrier means, operatively connected to said manually turnable means to be turned thereby about said substantially horizontal axis, for removably carrying a pair of slides respectively in planes which are perpendicular to each other at locations angularly distributed about said substantially horizontal axis for situating one slide in a projection position extending perpendicularly across the optical axis and the other slide in a plane parallel to the optical axis at a position accessible at said side of said housing to be conveniently removed from said slide-carrier means and replaced by another slide, so that slides can be displaced between said projection position and said side of said housing for successively projecting a series of slides in response to turning of said manually turnable means through predetermined angular increments about said substantially horizontal axis, and means coacting with said manually turnable means for limiting the latter to only one direction of rotation.

3. The combination of claim 2 and wherein said slide-carrier means provides for each slide a holder having a frame construction which permits introduction and removal of a slide from said holder.

4. In a photographic slide projector, a housing having a side where the operator is normally located during use of the projector, manually turnable means having a substantially horizontal axis, during use of the projector, said substantially horizontal axis being inclined with respect to the optical axis and said manually turnable means having a manually engageable member accessible at said side of said housing so that the operator can conveniently turn said manually turnable means, and slide-carrier means operatively connected to said manually turnable means to be turned thereby about said substantially horizontal axis, said slide-carrier means removably carrying a plurality of slides at locations angularly distributed about said substantially horizontal axis for situating one slide in a projection position extending perpendicularly across the optical axis and at least one additional slide in a position accessible at said side of said housing to be conveniently removed from said slide-carrier means and replaced by another slide, so that slides can be displaced between said projection position and said side of said housing for successively projecting a series of slides in response to turning of said manually turnable means through predetermined angular increments about said substantially horizontal axis, and blocking means operatively connected with said manually turnable means for blocking the latter against rotation in one direction so that said manually turnable means can only be turned in an opposite direction, said blocking means including a coil spring coaxially surrounding said substantially horizontal axis and fixed at one end to said manually turnable means for rotation therewith, said housing carrying a stationary ring coaxially surrounding said substantially horizontal axis and surrounded and engaged lightly by convolutions of said coil spring so that when said manually turnable means is turned in said one direction said coil spring will tighten its grip on said ring to prevent turning of said manually turnable means in said one direction, the convolutions of said spring tending to spread during turning of said manually turnable means in said opposite direction so that only turning in said opposite direction is permitted by said blocking means.

5. The combination of claim 2 and wherein a detent means is carried in part by said slide-carrier means and in part by a stationary element of said projector, for releasably holding said slide-carrier means at the angular positions where the slides will be successively situated at said projection position.

6. The combination of claim 2 and wherein a light-blocking means is operatively connected with said slide-carrier means for blocking the passage of light along the optical axis during shifting of one slide away from and another slide into said projection position.

7. The combination of claim 6 and wherein said light-blocking means is operatively connected with said slide-carrier means for rotary movement therewith.

8. The combination of claim 7 and wherein said light-blocking means is in the form of an opaque plate fixedly carried by said slide-carrier means between each pair of slides.

9. The combination of claim 6 and wherein said light-blocking means is turnable about said substantially horizontal axis independently of said slide-carrier means.

10. The combination of claim 9 and wherein said manually turnable means includes a shaft extending along said substantially horizontal axis and said light-blocking means being frictionally mounted on said shaft.

11. In a photographic slide projector, a housing having a side where the operator is normally located during use of the projector, manually turnable means having a substantially horizotnal axis, during use of the projector, said substantially horizontal axis being inclined with respect to the optical axis and said manually turnable means having a manually engageable member accessible at said side of said housing so that the operator can conveniently turn said manually turnable means, and slide-carrier means operatively connected to said manually turnable means to be turned thereby about said substantially horizontal axis, said slide carrier means removably carrying a plurality of slides at locations angularly distributed about said substantially horizontal axis for situating one slide in a projection position extending perpendicularly across the optical axis and at least one additional slide in a position accessible at said side of said housing to be conveniently removed from said slide-carrier means and replaced by another slide, so that slides can be displaced between said projection position and said side of said housing for successively projecting a series of slides in response to turning of said manually turnable means through predetermined angular increments about said substantially horizontal axis, light-blocking means operatively connected with said slide-carrier means for blocking the passage of light along the optical axis during shifting of one slide away from and another slide into said projection position, said light-blocking means being turnable about said substantially horizontal axis independently of said slide-carrier means, and said manually turnable means including a shaft extending along said substantially horizontal axis, said light-blocking means being frictionally mounted on said shaft, spring means acting on said light-blocking means for urging the latter to a position displaced beyond the optical axis so as not to interfere with the passage of light therealong and through a slide at said projection position, and stop means engaging said light-blocking means to limit displacement thereof by said spring means so as to determine the position of said light-blocking means when it is displaced from said optical axis.

12. In a photographic slide projector, a housing having a side where the operator is normally located during use of the projector, manually turnable means having a substantially horizontal axis, during use of the projector, said substantially horizontal axis being inclined with respect to the optical axis and said manually turnable means having a manually engageable member accessible at said side of said housing so that the operator can conveniently turn said manually turnable means, and slide-carrier means operatively connected to said manually turnable means to the turned thereby about said substantially horizontal axis, said slide carrier means removably carrying a plurality of slides at locations angularly distributed about said substantially horizontal axis for situating one slide in a projection position extending perpendicularly across the optical axis and at least one additional slide in a position accessible at said side of said housing to be conveniently removed from said slide-carrier means and replaced by another slide, so that slides can be displaced between said projection position and said side of said housing for successively projecting a series of slides in response to turning of said manually turnable means through predetermined angular increment about said substantially horizontal axis detent means releasably holding said slide-carrier means successively at angular positions where slides are successively situated in said projection position, said manually turnable means including a rotary shaft extending along said substantially horizontal axis and said slide-carrier means being frictionally mounted on said shaft so that while said slide carrier means is maintained stationary by said detent means said shaft can turn relative to said slide-carrier means, a lost-motion transmission operatively connected with said shaft and slide-carrier means for transmitting turning of said shaft to said slide-carrier means only after said shaft has turned through a given increment from a predetermined starting position with respect to said slide-carrier means to a predetermined end position with respect to said slide-carrier means, said lost-motion transmission providing for free turning of said shaft with respect to said slide-carrier means while the latter is held by said detent means during turning of said shaft through the angular increment determined by the angular distance between the starting and end positions of said lost-motion transmission, spring means operatively connected to said lost-motion transmission for urging the latter from said end position back to said starting position so as to urge said shaft to a given angular position with respect to said slide-carrier means, light-blocking means also frictionally carried by said shaft and turnable between a non-blocking position displaced from the optical axis and a blocking position extending across the optical axis, and a pair of stops respectively located in the path of turning of said light-blocking means for positioning the latter in said blocking and non-blocking positions respectively, whereby when said shaft is initially turned by the operator to displace said lost-motion transmission from said starting to said end position thereof in opposition to said spring means said light-blocking means will turn with said shaft from said non-blocking to said blocking position while said slide-carrier means remains stationary and said light-blocking means reaching said blocking position thereof when said lost-motion transmission reaches said end position thereof so that during continued turning of said shaft beyond said end position said slide-carirer means will be turned in opposition to said detent means to displace a slide away from said projection position and another slide into said projection position while said light-blocking means remains in said blocking position and said shaft turns with respect thereto, said detent means acting on said slide-carrier means for positioning the next slide in said projection position and the operator then releasing said shaft so that said spring means turns said shaft through the angular increment provided by said lost-motion transmission from said end back to said starting position thereof, and said light-blocking means turning with said shaft in response to turning of the latter by said spring means to be displaced from said blocking to said non-blocking position while said slide-carrier means remains stationary with the next slide in the projection position.

13. The combination of claim 12 and wherein said lost-motion transmission includes a pin-and-slot connection between said shaft and slide-carrier means having a slot whose length determines the extent of free movement of said shaft with respect to said slide-carrier means.

14. The combination of claim 13 and wherein said spring means has one end acting on said slide-carrier means and an opposite end acting on said shaft through said lost-motion transmission.

15. The combination of claim 14 and wherein said lost-motion transmission includes a pin fixed to said slide-carrier means and a disc fixed to said shaft and formed with a slot extending along a circle whose center is in the axis of said shaft, said slot receiving said pin and said spring being situated in said slot and being connected at one end to said pin and at an opposite end to said disc at an end of said slot distant from said pin.

16. The combination of claim 12 and wherein said slide-carrier means is axially shiftable along said shaft in response to operation of said detent means.

17. In a photographic slide projector, a housing having a side where the operator is normally located during use of the projector, manually turnable means having a substantially horizontal axis, during use of the projector, said substantially horizontal axis being inclined with respect to the optical axis and said manually turnable means having a manually engageable member accessible at said side of said housing so that the operator can conveniently turn said manually turnable means, and slide-carrier means operatively connected to said manually turnable means to be turned thereby about said substantially horizontal axis, said slide carrier means removably carrying a plurality of slides at locations angularly distributed about said substantially horizontal axis for situating one slide in a projection position extending perpendicularly across the optical axis and at least one additional slide in a position accessible at said side of said housing to be conveniently removed from said slide-carrier means and replaced by another slide, so that slides can be displaced between said projection position and said side of said housing for successively projecting a series of slides in response to turning of said manually turnable means through predetermined angular increments about said substantially horizontal axis, a projection lamp providing light which is directed along the optical axis through the projection position, and optical means cooperating with part of the light provided by said projection lamp for directing light therefrom through a slide situated at said side of said housing.

18. In a photographic slide projector, a housing having a side where the operator is normally located during use of the projector, manually turnable means having a substantially horizontal axis, during use of the projector, said substantially horizontal axis being inclined with respect to the optical axis and said manually turnable means having a manually engageable member accessible at said side of said housing so that the operator can conveniently turn said manually turnable means, and slide-carrier means operatively connected to said manually turnable means to be turned thereby about said substantially horizontal axis, said slide carrier means removably carrying a plurality of slides at locations angularly distributed about said substantially horizontal axis for situating one slide in a projection position extending perpendicularly across the optical axis and at least one additional slide in a position accessible at said side of said housing to be conveniently removed from said slide-carrier means and replaced by another slide, so that slides can be displaced between said projection position and said side of said housing for successively projecting a series of slides in response to turning of said manually turnable means through predetermined angular increments about said substantially horizontal axis, said housing carrying a wall situated in a plane which is perpendicular to said substantially horizontal axis and which extends at an angle to the optical axis, and said manually turnable means including a rotary shaft supported by said wall for rotary movement.

References Cited
UNITED STATES PATENTS

| | | | |
|---|---|---|---|
| 488,057 | 12/1892 | Breed | 88—28 |
| 3,045,529 | 7/1962 | Kuehnle | 88—27 |

NORTON ANSHER, *Primary Examiner.*

W. FRYE, *Assistant Examiner.*